United States Patent
Canata

(10) Patent No.: US 6,594,041 B1
(45) Date of Patent: Jul. 15, 2003

(54) LOG TIME PROCESSING AND STITCHING SYSTEM

(75) Inventor: Philip Eugene Canata, Austin, TX (US)

(73) Assignee: Applied Science Fiction, Inc., Austin, TX (US)

( * ) Notice: Subject to any disclaimer, the term of this patent is extended or adjusted under 35 U.S.C. 154(b) by 0 days.

(21) Appl. No.: 09/196,208

(22) Filed: Nov. 20, 1998

(51) Int. Cl.⁷ ............................................. H04N 1/46
(52) U.S. Cl. ........................ 358/506; 358/509; 358/487; 358/475
(58) Field of Search .......................... 348/362, 97, 96; 358/487, 506, 509, 475; 355/24, 402; 356/443, 444, 493; 396/575, 564

(56) References Cited

U.S. PATENT DOCUMENTS

| | | | |
|---|---|---|---|
| 2,404,138 A | 7/1946 | Mayer | 396/604 |
| 3,520,689 A | 7/1970 | Nagae et al. | 430/376 |
| 3,520,690 A | 7/1970 | Nagae et al. | 430/373 |
| 3,587,435 A | 6/1971 | Chioffe | 396/612 |
| 3,615,479 A | 10/1971 | Kohler et al. | 430/30 |
| 3,615,498 A | 10/1971 | Aral | 430/468 |
| 3,617,282 A | 11/1971 | Bard | 430/379 |
| 3,747,120 A | 7/1973 | Stemme | 347/70 |
| 3,833,161 A | 9/1974 | Krumbein | 226/92 |
| 3,903,541 A | 9/1975 | Von Meister et al. | 396/604 |
| 3,946,398 A | 3/1976 | Kyser et al. | 347/70 |
| 3,959,048 A | 5/1976 | Stanfield et al. | 156/94 |
| 4,026,756 A | 5/1977 | Stanfield et al. | 156/554 |
| 4,081,577 A | 3/1978 | Horner | 427/424 |
| 4,142,107 A | 2/1979 | Hatzakis et al. | 250/559.22 |
| 4,215,927 A | 8/1980 | Grant et al. | 396/611 |
| 4,249,985 A | 2/1981 | Stanfield | 156/554 |
| 4,265,545 A | 5/1981 | Slaker | 356/431 |
| 4,301,469 A | 11/1981 | Modeen et al. | 358/539 |
| 4,490,729 A | 12/1984 | Clark et al. | 347/76 |

(List continued on next page.)

FOREIGN PATENT DOCUMENTS

| | | | |
|---|---|---|---|
| EP | 0 261 782 A2 | 8/1987 | H04N/1/46 |
| EP | 0 422 220 A1 | 3/1989 | A61B/6/03 |
| EP | 0 482 790 B1 | 9/1991 | H04N/1/40 |
| EP | 0 525 886 A3 | 7/1992 | G03D/5/00 |
| EP | 0 580 293 A1 | 6/1993 | H04N/1/04 |
| EP | 0 580 293 A1 | 1/1994 | H04N/1/04 |

(List continued on next page.)

OTHER PUBLICATIONS

"Adaptive Fourier Threshold Filtering: A Method to Reduce Noise and Incoherent Artifacts in High Resolution Cardiac Images", Doyle, M., et al., 8306 Magnetic Resonance in Medicine 31, No. 5, Baltimore, MD, May, pp. 546–550, 1994.

"Anisotropic Spectral Magnitude Estimation Filters for Noise Reduction and Image Enhancement", Aich, T., et al., Philips GmbH Research Laboratories, IEEE, pp. 335–338, 1996.

(List continued on next page.)

Primary Examiner—Cheukfan Lee
(74) Attorney, Agent, or Firm—Raymond M. Galasso; Simon, Galasso & Frantz PLC

(57) ABSTRACT

A log-time stitching system provides for directly determining an accurate pixel exposure for each pixel in a recorded image. The present invention provides a digital processing system in which signals associated with a pixel are obtained at each of a plurality of different development times of the film being developed. A regression analysis that compares these different development times versus the natural log of time is made, to obtain a best fit line of this data, which line is then used to determine a "b" value. This "b" value or "fitting constant" corresponds to the intersection of the y-intercept and the best fit line. It has been discovered that this "b" value is substantially directly proportional to the log exposure of the pixel. Accordingly, this "b" value can be directly used to determine an appropriate exposure of the pixel.

22 Claims, 5 Drawing Sheets

U.S. PATENT DOCUMENTS

| | | | |
|---|---|---|---|
| 4,501,480 A | 2/1985 | Matsui et al. | 396/569 |
| 4,564,280 A | 1/1986 | Fukuda | 396/611 |
| 4,594,598 A | 6/1986 | Iwagami | 347/37 |
| 4,621,037 A | 11/1986 | Kanda et al. | 430/30 |
| 4,623,236 A | 11/1986 | Stella | 396/606 |
| 4,633,300 A | 12/1986 | Sakai | 348/223.1 |
| 4,636,808 A | 1/1987 | Herron | 347/76 |
| 4,666,307 A | 5/1987 | Matsumoto et al. | 356/404 |
| 4,670,779 A | 6/1987 | Nagano | 358/512 |
| 4,736,221 A | 4/1988 | Shidara | 396/609 |
| 4,741,621 A | 5/1988 | Taft et al. | 356/606 |
| 4,745,040 A | 5/1988 | Levine | 430/21 |
| 4,755,844 A | 7/1988 | Tsuchiya et al. | 396/611 |
| 4,777,102 A | 10/1988 | Levine | 430/21 |
| 4,796,061 A | 1/1989 | Ikeda et al. | 355/73 |
| 4,814,630 A | 3/1989 | Lim | 250/208.3 |
| 4,821,114 A | 4/1989 | Gebhardt | 358/512 |
| 4,845,551 A | 7/1989 | Matsumoto | 358/506 |
| 4,851,311 A | 7/1989 | Millis et al. | 430/30 |
| 4,857,430 A | 8/1989 | Millis et al. | 430/30 |
| 4,875,067 A | 10/1989 | Kanzaki et al. | 396/622 |
| 4,969,045 A | 11/1990 | Haruki et al. | 348/229.1 |
| 4,994,918 A | 2/1991 | Lingemann | 348/97 |
| 5,027,146 A | 6/1991 | Manico et al. | 396/575 |
| 5,034,767 A | 7/1991 | Netz et al. | 396/604 |
| 5,101,286 A | 3/1992 | Patton | 358/487 |
| 5,124,216 A | 6/1992 | Giapis et al. | 430/30 |
| 5,155,596 A | 10/1992 | Kurtz et al. | 348/97 |
| 5,196,285 A | 3/1993 | Thomson | 430/30 |
| 5,200,817 A | 4/1993 | Birnbaum | 358/518 |
| 5,212,512 A | 5/1993 | Shiota | 396/612 |
| 5,231,439 A | 7/1993 | Takahashi et al. | 396/600 |
| 5,235,352 A | 8/1993 | Pies et al. | 347/71 |
| 5,255,408 A | 10/1993 | Blackman | 15/308 |
| 5,266,805 A | 11/1993 | Edgar | 250/330 |
| 5,267,030 A | 11/1993 | Giorgianni et al. | 358/527 |
| 5,292,605 A | 3/1994 | Thomson | 430/30 |
| 5,296,923 A | 3/1994 | Hung | 358/527 |
| 5,334,247 A | 8/1994 | Columbus et al. | 118/411 |
| 5,350,651 A | 9/1994 | Evans et al. | 430/21 |
| 5,350,664 A | 9/1994 | Simons | 430/362 |
| 5,357,307 A | 10/1994 | Glanville et al. | 396/626 |
| 5,360,701 A | 11/1994 | Elton et al. | 430/501 |
| 5,371,542 A | 12/1994 | Pauli et al. | 348/262 |
| 5,391,443 A | 2/1995 | Simons et al. | 430/21 |
| 5,414,779 A | 5/1995 | Mitch | 382/199 |
| 5,416,550 A | 5/1995 | Skye et al. | 396/570 |
| 5,418,119 A | 5/1995 | Simons | 430/507 |
| 5,418,597 A | 5/1995 | Lahcanski et al. | 355/76 |
| 5,432,579 A | 7/1995 | Tokuda | 358/302 |
| 5,436,738 A | 7/1995 | Manico | 358/503 |
| 5,440,365 A | 8/1995 | Gates et al. | 396/570 |
| 5,447,811 A | 9/1995 | Buhr et al. | 430/20 |
| 5,448,380 A | 9/1995 | Park | 358/520 |
| 5,452,018 A | 9/1995 | Capitant et al. | 348/651 |
| 5,465,155 A | 11/1995 | Edgar | 358/500 |
| 5,477,345 A | 12/1995 | Tse | 358/500 |
| 5,496,669 A | 3/1996 | Pforr et al. | 430/22 |
| 5,516,608 A | 5/1996 | Hobbs et al. | 430/30 |
| 5,519,510 A | 5/1996 | Edgar | 358/471 |
| 5,546,477 A | 8/1996 | Knowles et al. | 382/242 |
| 5,550,566 A | 8/1996 | Hodgson et al. | 345/555 |
| 5,552,904 A | 9/1996 | Ryoo et al. | 358/518 |
| 5,563,717 A | 10/1996 | Koeng et al. | 358/406 |
| 5,568,270 A | 10/1996 | Endo | 358/298 |
| 5,576,836 A | 11/1996 | Sano et al. | 358/302 |
| 5,581,376 A | 12/1996 | Harrington | 358/518 |
| 5,587,752 A | 12/1996 | Petruchik | 396/315 |
| 5,596,415 A | 1/1997 | Cosgrove et al. | 358/296 |
| 5,627,016 A | 5/1997 | Manico | 430/434 |
| 5,649,260 A | 7/1997 | Wheeler et al. | 396/569 |
| 5,664,253 A | 9/1997 | Meyers | 396/603 |
| 5,664,255 A | 9/1997 | Wen | 396/627 |
| 5,667,944 A | 9/1997 | Reem et al. | 430/359 |
| 5,678,116 A | 10/1997 | Sugimoto et al. | 396/611 |
| 5,691,118 A | 11/1997 | Haye | 430/357 |
| 5,695,914 A | 12/1997 | Simon et al. | 430/379 |
| 5,698,382 A | 12/1997 | Nakahanada et al. | 430/418 |
| 5,726,773 A | 3/1998 | Mehlo et al. | 358/474 |
| 5,739,897 A | 4/1998 | Frick et al. | 355/40 |
| 5,771,107 A | 6/1998 | Fujimoto et al. | 358/464 |
| 5,790,277 A | 8/1998 | Edgar | 358/487 |
| 5,835,795 A | 11/1998 | Craig et al. | 396/6 |
| 5,835,811 A | 11/1998 | Tsumura | 396/598 |
| 5,870,172 A | 2/1999 | Blume | 355/27 |
| 5,880,819 A | 3/1999 | Tanaka et al. | 355/75 |
| 5,892,595 A | 4/1999 | Yamakawa et al. | 358/530 |
| 5,930,388 A | 7/1999 | Murakami et al. | 382/167 |
| 5,959,720 A | 9/1999 | Kwon et al. | 355/38 |
| 5,963,662 A | 10/1999 | Vachtsevanos et al. | 382/150 |
| 5,966,465 A | 10/1999 | Keith et al. | 382/232 |
| 5,979,011 A | 11/1999 | Miyawaki et al. | 15/308 |
| 5,982,936 A | 11/1999 | Tucker et al. | 382/233 |
| 5,982,937 A | 11/1999 | Accad | 382/239 |
| 5,982,941 A | 11/1999 | Loveridge et al. | 382/260 |
| 5,982,951 A | 11/1999 | Katayama et al. | 382/284 |
| 5,988,896 A | 11/1999 | Edgar | 396/604 |
| 5,991,444 A | 11/1999 | Burt et al. | 382/232 |
| 5,998,109 A | 12/1999 | Hirabayashi | 430/434 |
| 6,000,284 A | 12/1999 | Shin et al. | 73/150 |
| 6,005,987 A | 12/1999 | Nakamura et al. | 382/294 |
| 6,065,824 A | 5/2000 | Bullock et al. | 347/19 |
| 6,069,714 A | 5/2000 | Edgar | 358/487 |
| 6,088,084 A | 7/2000 | Nishio | 355/75 |
| 6,089,687 A | 7/2000 | Helterline | 347/7 |
| 6,101,273 A | 8/2000 | Matama | 382/169 |
| 6,102,508 A | 8/2000 | Cowger | 347/7 |
| 6,137,965 A | 10/2000 | Burgeios et al. | 396/626 |
| 6,200,738 B1 | 3/2001 | Takano et al. | 430/362 |
| 6,398,428 B1 * | 6/2002 | Szajewski et al. | 396/575 |
| 6,404,516 B1 * | 6/2002 | Edgar | 358/487 |
| 6,439,784 B1 * | 8/2002 | Keyes et al. | 396/564 |

FOREIGN PATENT DOCUMENTS

| | | | | |
|---|---|---|---|---|
| EP | 0 601 364 A1 | 6/1994 | | H04N/1/387 |
| EP | 0 669 753 A2 | 2/1995 | | H04N/1/407 |
| EP | 0 794 454 A2 | 2/1997 | | G03B/27/73 |
| EP | 0 768 571 A2 | 4/1997 | | G03D/13/00 |
| EP | 0 806 861 A1 | 11/1997 | | H04N/1/00 |
| EP | 0 878 777 A2 | 11/1998 | | G06T/5/40 |
| EP | 0 930 498 A2 | 12/1998 | | G01N/21/88 |
| WO | WO 98/25399 | 6/1998 | | H04N/1/38 |
| WO | WO 98/34157 | 8/1998 | | |
| WO | WO 98/34397 | 8/1998 | | |
| WO | WO 99/43148 | 8/1999 | | H04N/1/00 |
| WO | WO 99/43149 | 8/1999 | | H04N/1/100 |
| WO | WO 01/01197 | 1/2001 | | G03D/5/00 |
| WO | WO 01/13174 A1 | 2/2001 | | G03D/5/06 |
| WO | WO 01/45042 A1 | 6/2001 | | G06T/5/00 |
| WO | WO 01/50192 A1 | 7/2001 | | G03C/7/407 |
| WO | WO 01/50193 A1 | 7/2001 | | G03C/7/407 |
| WO | WO 01/50194 A1 | 7/2001 | | G03C/7/407 |
| WO | W0 01/50197 A1 | 7/2001 | | G03C/7/42 |
| WO | WO 01/52556 A2 | 7/2001 | | H04N/9/11 |

OTHER PUBLICATIONS

"Adaptive–neighborhood filtering of images corrupted by signal–dependent noise", Rangayyan, R., et al., Applied Optics, vol. 37, No. 20, pp. 4477–4487, Jul. 10, 1998.

"Grayscale Characteristics", The Nature of Color Images, Photographic Negatives, pp. 163–168.

"Parallel Production of Oligonucleotide Arrays Using Membranes and Reagent Jet Printing", Stimpson, D., et al., Research Reports, BioTechniques, vol. 25, No. 5, pp. 886–890, 1998.

"Low–Cost Display Assembly and Interconnect Using Ink–Jet Printing Technology", Hayes, D. et al., Display Works '99, MicroFab Technologies, Inc., pp. 1–4, 1999.

"Ink–Jet Based Fluid Microdispensing in Biochemical Applications", Wallace, D., MicroFab Technologies, Inc., Laboratory Automation News, vol. 1, No. 5, pp. 6–9, Nov., 1996.

"Protorealistic Ink–Jet Printing Through Dynamic Spot Size Control", Wallace, D., Journal of Imaging Science and Technology, vol. 40, No. 5, pp. 390–395, Sep./Oct. 1996.

"MicroJet Printing of Solder and Polymers for Multi–Chip Modules and Chip–Scale Package", Hayes, D., et al., MicroFab Technologies, Inc.

"A Method of Characterisstics Model of a Drop–on–Demand Ink–Jet Device Using an Integral Method Drop Formation Model", Wallace, D., MicroFab Technologies, Inc., The American Society of Mechanical Engineers, Winter Annual Meeting, pp. 1–9, Dec. 10–15, 1989.

"Digital Imaging Equipment White Papers", Putting Damaged Film on ICE, www.nikonusa.com/reference/whitepapers/imaging, Nikon Corporation, Nov. 28, 2000.

* cited by examiner

LOG TIME PROCESSING AND STITCHING SYSTEM

FIELD OF THE INVENTION

The present invention relates generally to electronic film developing and more particularly, to apparatus and methods for determining the optimum exposure of pixels in a time-scanned film image.

BACKGROUND OF THE INVENTION

Chemical film development traditionally involves the chemical manipulation of an entire image which has been recorded on conventional film. Conventional film includes multiple layers of varying granularity distributions of silver halide crystals. Broadly stated, multiple film layers are used with color film to separately capture and reproduce color information. The crystal granularity distributions further provide for capturing image details under different lighting and/or desired film exposure conditions or "speeds". That is, larger or more "coarsely-grained" crystals require exposure to fewer photons of light during picture-taking to enable proper developing. Conversely, smaller or more "fine-grained" crystals that together encompass an area equal to that of a single larger grain will require more light during picture-taking to enable proper developing of each grain. Modem color film typically uses three layers or "emulsion coatings" for each color, each with a different granularity distribution, thereby enabling image detail to be recorded on the film at varying exposures for each color.

Unfortunately, while film can be viewed as recording all essential picture information, conventional chemical processing does not enable optimal reproduction of individual picture elements. More specifically, different picture elements such as highlights, midtones and shadows, while recorded on the same film layer, each require a different amount of development time to be optimally reproduced. Highlights, for example, might be optimally developed in one minute while midtones might require two minutes and shadows might require four minutes. However, chemical processing develops all picture elements at the same time. Thus, a compromise or approximation must be made as to an acceptable development time for accommodating all image elements.

Conventional techniques have been developed to improve the overall quality of a picture by taking into account varying developing time requirements. However, the resulting picture element handling capabilities are nevertheless subject to chemical processing limitations. For example, using monochrome film having multiple granularity distribution, and thus varying exposure-sensitivity layers, multiple exposures of a single still image can be recorded and later merged in a darkroom. However, such techniques still provide only gross adjustments to multiple picture element combinations, and require extensive effort and often specialized film and/or processing to do so.

Digital film processing ("DFP") takes an entirely different approach. DFP provides for capturing raw image data directly from the film itself while it is being developed. Each channel (such as red, green, blue) of each element or pixel will typically be captured separately at multiple developing time increments or timed-scans. The pixel data of each timed-scan is then analyzed and/or manipulated to provide optimally an image that uses the appropriate exposure for each pixel.

FIG. 1 illustrates certain aspects of a DFP system taught in U.S. Pat. No. 5,519,510, and is taken from FIG. 9 of that patent. As shown, the DFP system provides scanning a system for scanning an image recorded on film 101 directly from film 101 while film 101 is being developed. At multiple times during development of film 101, infrared light sources 104 or light-source-array projects infrared light 11 and 12 at color film 101 and a portion of the image is captured (i.e. "timed-scanned"). Scanning a three-layer film 101, for example, includes capturing reflected light 11 from portions (e.g. portion 11a) contained in the first or "front" film layer 111 and capturing reflected light 12 from portions (e.g. portion 12a) contained in a third or "back" film layer 113. Portions (e.g. portion 11a) contained in the second (i.e. "middle" or "through") layer are also captured by scanning transmitted light 11 passing through film 101, from which scanned front layer and back layer values for corresponding front layer and back layer portion scans are then subtracted. This process is repeated for each portion, thereby producing front-layer, middle-layer and back-layer portion information for each portion position at each timed-scan during development of film 101. Scanned portion information (or "pixel information") is then processed as described hereinafter with reference to FIGS. 2a–3.

As shown in FIG. 2a, during picture-taking with camera 210, a single picture 201 recorded onto film 101 or "exposed" film (FIG. 1) will typically include discernable picture elements such as highlights 211a, midtones 211b and shadows 211c.

Turning to FIG. 2b, exposed film 101 is then subjected to DFP processing. First, the above-mentioned timed-scans are taken using scanning system. During processing of film 101, an early scan 202a (e.g. one minute) will best reveal pixels corresponding to highlights 211a, while midtones 211b and shadows 211c will be underdeveloped. A later scan (e.g. two minutes) will better reveal midtones 211b, while highlights 211a will become overdeveloped. Still later scans will better reveal shadows 211c at the expense of highlights 211a and midtones 211b.

FIG. 3 illustrates that while several timed-scans are typically taken, not all of the scans obtained throughout film development are typically required. Rather, a sufficient number of scans are desirably taken such that the optimal exposure of selected picture elements in each film layer can be deduced by extrapolating from the limited number of scans actually taken. Individual scans can further be combined to reduce memory requirements. For example, scans 302 and 304 can be combined to produces scan 308.

FIG. 3 also illustrates how the DFP system further provides an image-based processing/stitching system for processing and merging of groups of picture elements in order to form a completed processed image. Creating a merged image will be generally referred to herein as "stitching" regardless of the specific implementation utilized. As taught in the 510 patent, an approximation is preferably made as to the best exposure for different groups of picture elements utilized (i.e. in this case, highlight, midtone and shadow portions of the image stored on the film). Next, the different groups of picture elements can be combined by aligning, cutting and pasting them together 320 to yield the finished image 322.

Unfortunately, if many timed-scans are needed, memory requirements become exorbitant. Accordingly, when fewer timed-scans are used, or when the actual time-scan time varies from the desired time-scan time, estimates of timed-scans which estimates were not reliable, needed to be made in order for the groups of picture elements to appear as a single continuous picture. Thus, adjustment approximations according to available scanned data were required, often yielding less-than-ideal results and often requiring significant computation.

U.S. Patent Application Ser. No. 60,075,562, filed Feb. 23, 1998, entitled "Parametric Image Stitching" teaches an alternative method of stitching, and is hereby expressly incorporated by reference. In that application, the tedium of pasting groups of picture elements is replaced by forming a mathematical model representing the recorded image and then resolving the model as a completed image. Modeling, in this instance, generally includes the ability to process stitch picture elements (e.g. pixels) without reference to the overall picture formed on the film. As described, received timed-scan pixel data is tagged with the time of capture (i.e. a relative and/or absolute indicator of the time of each scan during the course of film processing). Then, for each pixel at each time, regression parameters are calculated and summed, the optimal density of each pixel position on the film is predicted, a gamma correction function is applied, and a brightness value for each pixel is determined.

More specifically, as shown in FIG. 4, different curves representing low, medium and high exposure timed-scans were obtained for each pixel based upon a "best fit" of the received pixel data for each of the different timed-scans. Also, an optimum density curve is empirically derived, as shown by dotted line 404. According to this application, the actual best "brightness" for a pixel can be determined based upon the intersection of the optimum density curve with the best fit curve depending upon the characteristic of the pixel, i.e. whether it was a low, mid or high exposure pixel.

Unfortunately, this implementation not only requires substantial computation, but again ultimately results in a predicted approximation of the optimal exposure. Thus, the determined brightness value nevertheless might result in an inaccurate reproduction of the filmed subject. Accordingly, there remains a need for an DPF stitching method that provides a more accurate reproduction of a filmed subject. There is further a need for an DPF stitching method having reduced computational requirements.

SUMMARY OF THE INVENTION

It is an object of the present invention to provide a method of directly determining the exposure, or brightness, of a given pixel of data associated with a portion of a scanned image of a developing negative.

It is a further object of the present invention to directly determine exposure information associated with each layer of a multi-layer color film, for each pixel.

These and other advantages are provided for by the present invention through a digital processing system in which signals associated with a pixel are obtained at each of a plurality of different development times of the film being developed. A regression analysis that compares these different development times versus the natural log of time is made, to obtain a best fit line of this data, which line is then used to determine a "b" value. This "b" value or "fitting constant" preferably corresponds to the intersection of the y-intercept and the best fit line. It has been discovered that this "b" value is substantially directly proportional to the log exposure of the pixel. Accordingly, this "b" value can be directly used to determine the appropriate exposure of the pixel.

BRIEF DESCRIPTION OF THE DRAWINGS

FIG. 2b. illustrates how, in prior art digital film processing, timed-scans capture the varying exposure picture elements of FIG. 2a;

FIG. 5b is a graph that further illustrates the discovered relationship of FIG. 5a;

DETAILED DESCRIPTION OF THE PREFERRED EMBODIMENTS

Figure 1:
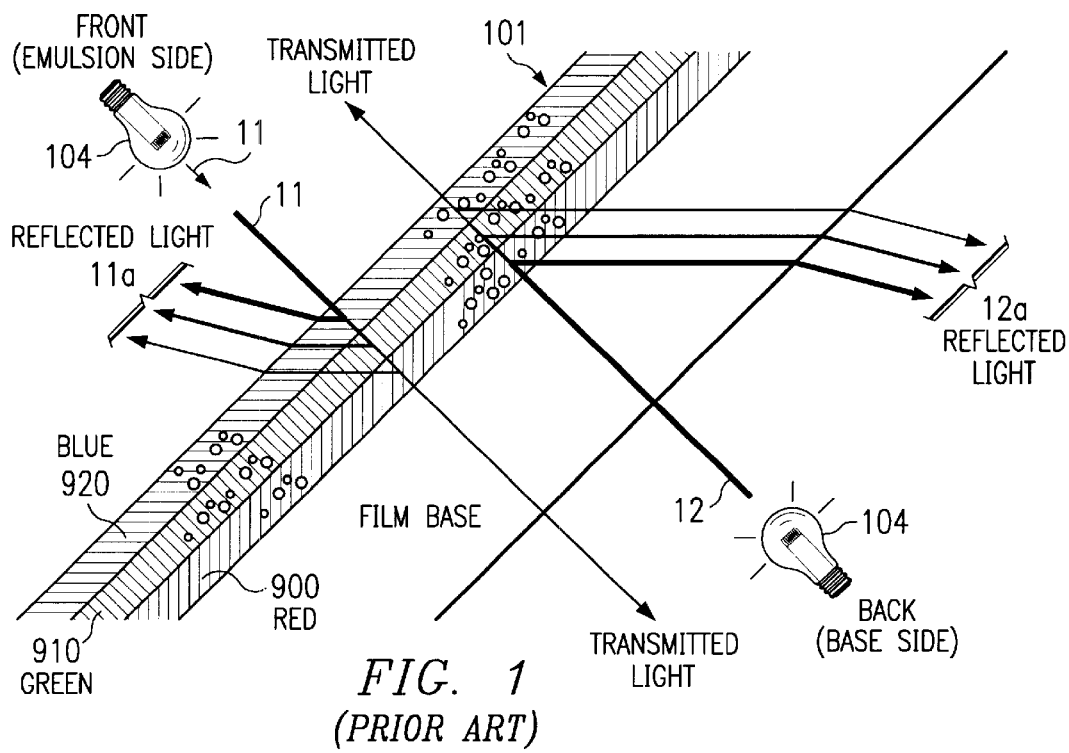
FIG. 1 is simplified partial cutaway view illustrating how a prior art digital film processing system scans and then pieces together an image.
Figure 4:
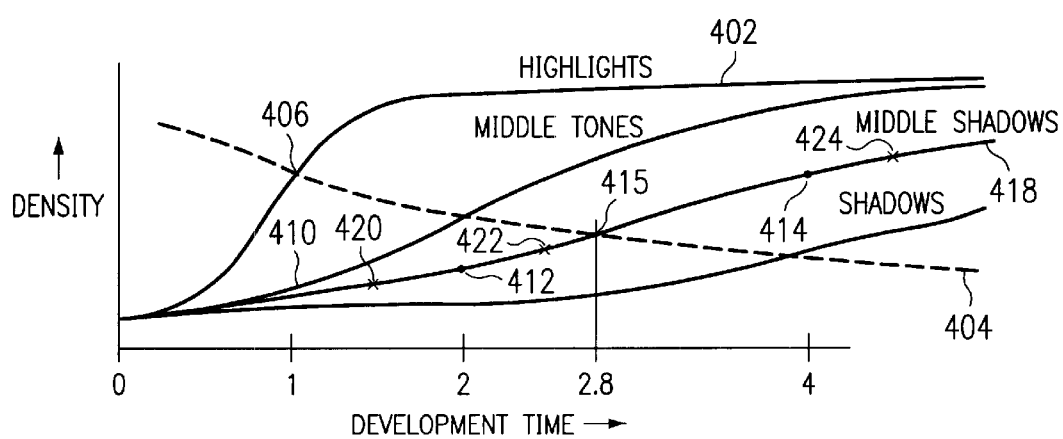
FIG. 4 graphically illustrates how a prior art digital film processing system stitches together film elements.
Figure 2A:
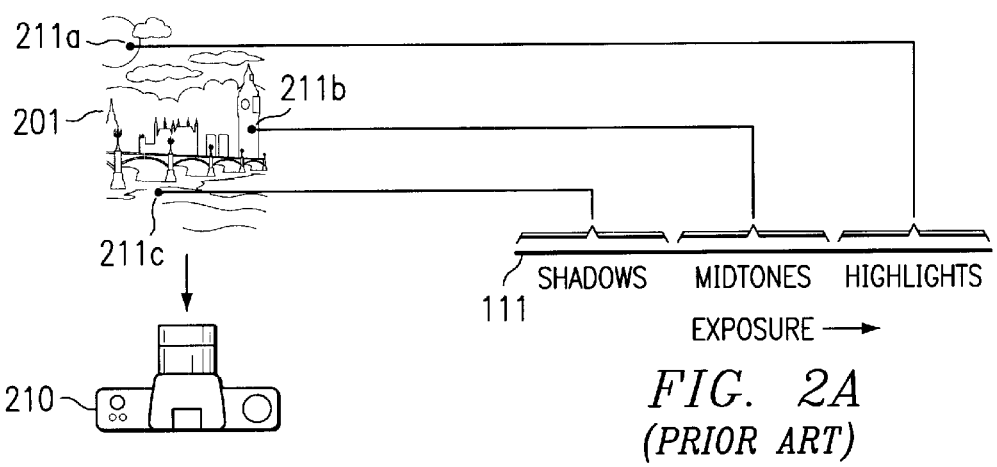
FIG. 2a illustrates how, in prior art digital film processing, a picture recorded on film is considered in terms of varying exposure picture elements.
Figure 2B:
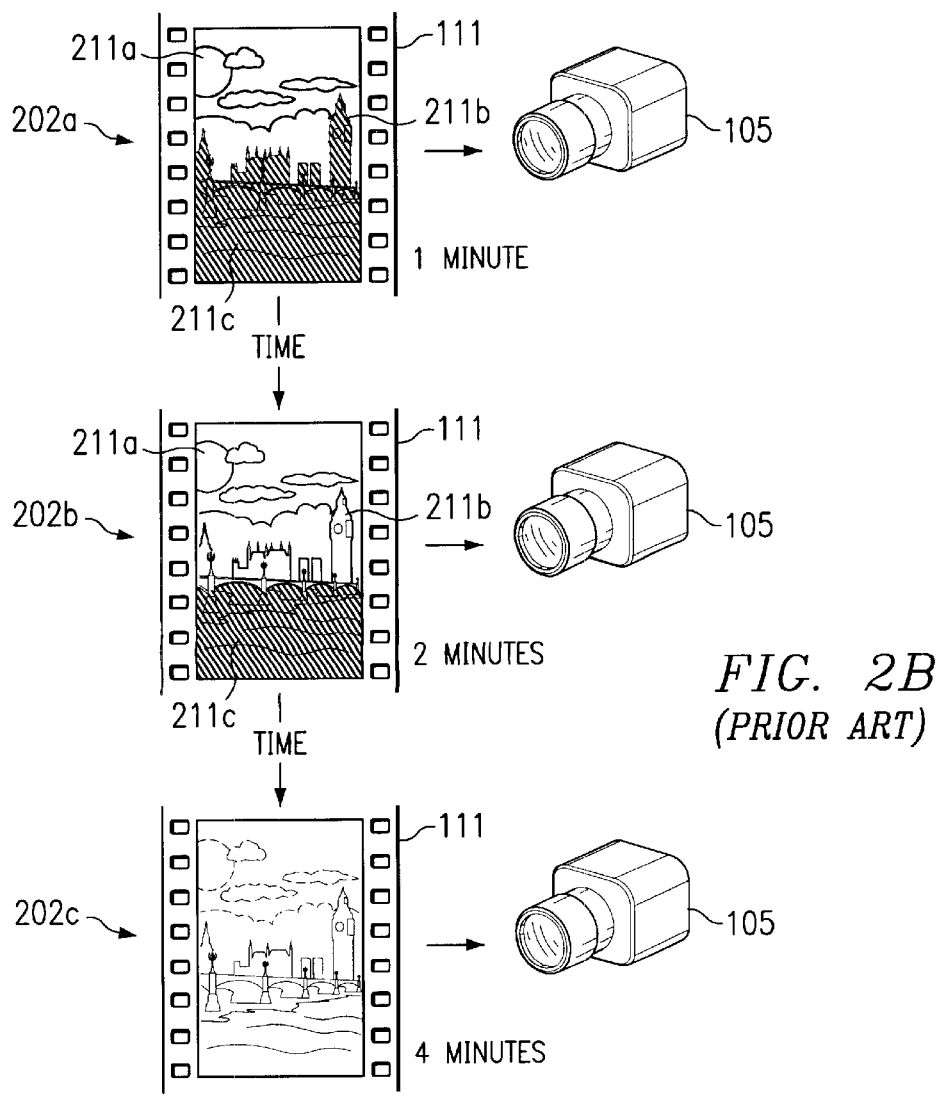
Figure 3:
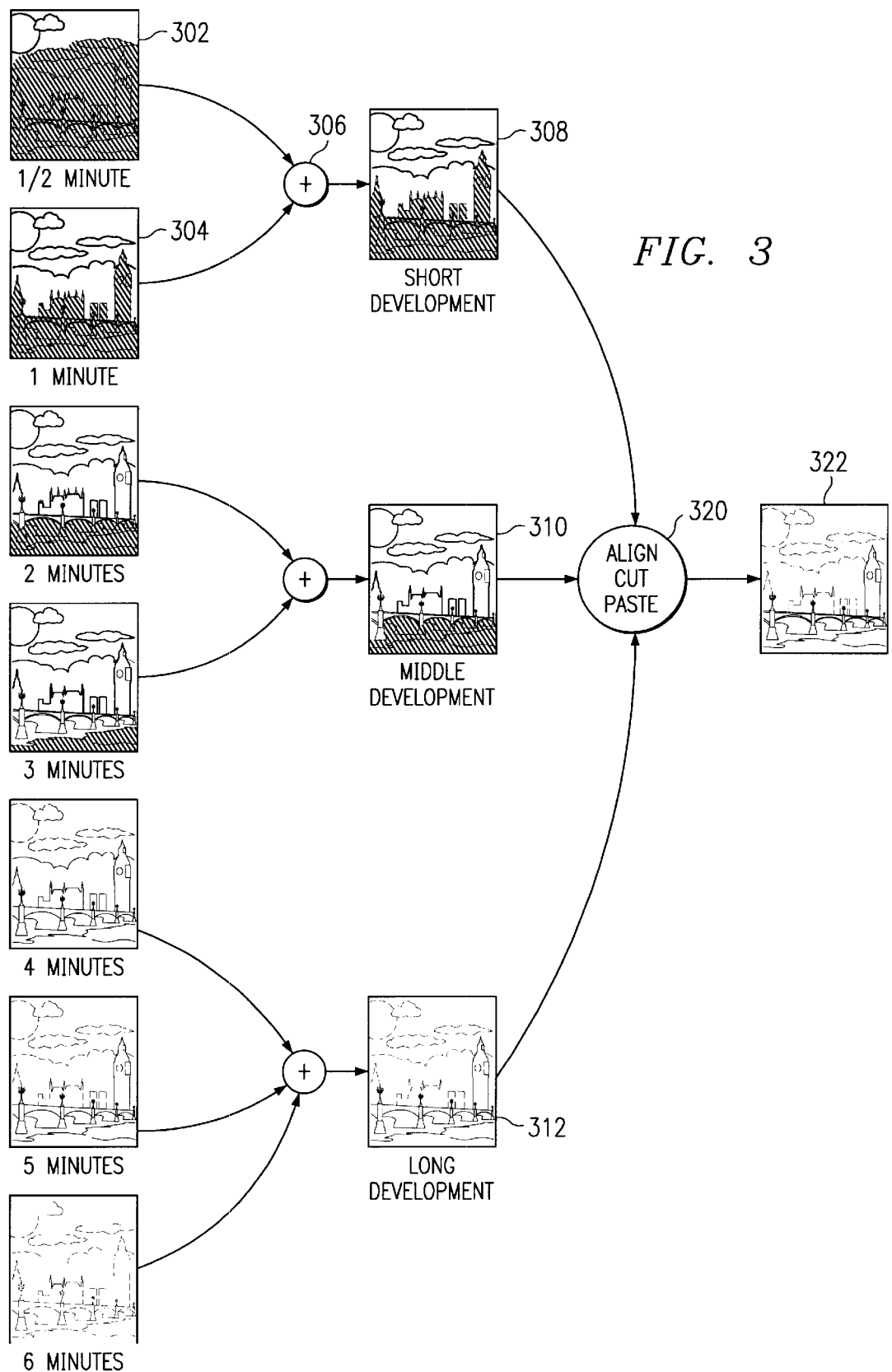
FIG. 3 illustrates how a prior art digital film processing system stitches together picture elements.

Modifications of images through electronic film processing to achieve some special enhancement or effect are desirable, and it will be appreciated that the ability to implement such modifications is facilitated by the present invention. However, an equally if not more desirable capability of the present invention, is to accurately reproduce images recorded on film. Given the discussed difficulties encountered with determining the appropriate exposure of separate picture elements, a more reliable method is preferred, which method comprises the processing and/or stitching of image data (e.g. pixels) without the need to reference the overall graphical depiction. For example, pixel data values corresponding to timed-scans of developing photographic film are received by a processing system in which the invention is preferably implemented. Various ones of the obtained pixel data values for different pixels can then be processed/stitched together without forming or referring to the scanned image as a whole. The stitched image data can then be further processed (e.g. color tested and corrected if needed) and then printed. In addition, since the image data is preferably handled in a computer-readable form throughout, it will be appreciated that the data can also be stored, retrieved, shared and/or transferred in any manner generally applicable to other forms of computer-readable data.

Accurate electronic reproduction of an image is preferably accomplished by determining a fitting constant corresponding to the number of photons of light to which each pixel, corresponding to a portion of the film, was exposed during picture-taking. Thus, an accurate reproduction of each pixel (or a combination of pixels) can be determined, an accurate reproduction of the image can be reconstructed and the resultant image data can be further processed and/or printed. As discussed hereinafter, pixel data for single layer monochromatic film will be discussed, it will be readily apparent, however, that the present invention is most desirably implemented for use with a multi-layer film capable of color reproductions and that, in such implementation, each color channel has pixel information relating to only that channel's color and that information will be processed to determine the appropriate exposure values for each channel. It should be noted that with reference to each color channel in a color image, that the front, back and through data obtained by scanning the developing image at different development times provides data in a (front, back, through) space that will need to be converted to a (red, green, blue) color space. The present invention is concerned not with this conversion, but with knowing that the detected signal values, (in front, back, through space if it is a color image) are properly corrected for exposure.

The present invention recognizes, however, that it is possible to directly set the exposure of each pixel by directly finding the level at which each pixel was originally exposed due to photons incident upon the film. Those skilled in the art will also appreciate that further processing can also be utilized (i.e. in addition to obtaining a "b" value or "fitting constant") where absolute original exposure reproduction is required.

Figure 5A:
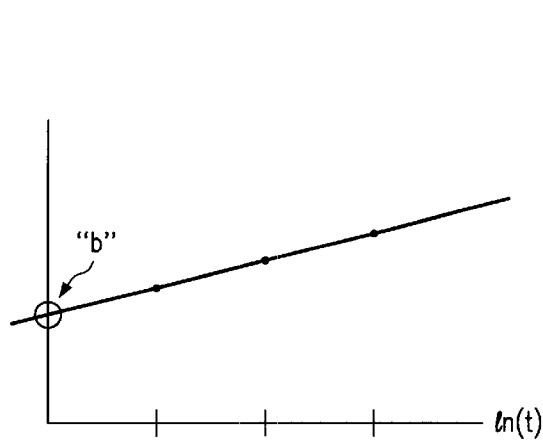
FIG. 5a is a graph that illustrates a discovered relationship between a "b" constant on log exposure that is advantageously utilized by the present invention.

According to the present invention, as a general overview, signal values are detected at several different development times, such as the low, mid and high exposures previously discussed. Thereafter, these detected signal values are used to find the best linear fit of signal to the natural log of time. This fit will preferably be of the form:

$$S = a(\ln(\text{time})) + b,$$

where S is the detected signal value, time is the time at which the signal value was detected, "a" is a fitting value and "b" is a fitting constant. The value of "b" will preferably be the y-intercept of best linear fit. FIG. 5A illustrates an example of the plotted signal values on a ln (time) axis, and the corresponding "b" value at the y-intercept. (The terms "b value" and "fitting constant" will hereinafter be used interchangeably.)

The present invention also recognizes that the "b" value is directly proportional to the log of the pixel's initial exposure. As a result of this recognition, once the "b" value is determined, it can be used to determine the appropriate exposure for each pixel.

Figure 5B:
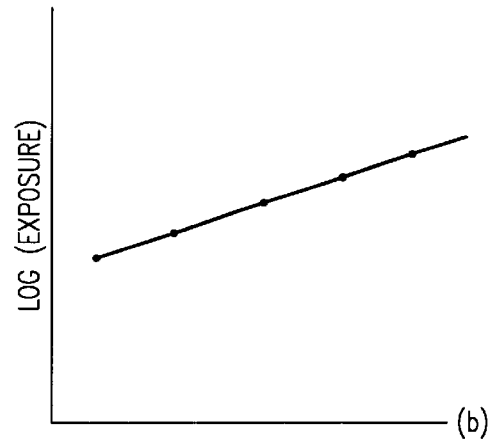

The FIG. 5B graph illustrates the discovered linear relationship illustrated by line 501 between "b" values and log (exposure). Thus, broadly stated, the present invention enables an appropriate exposure value to be determined for each pixel and, as a result, use the exposure value in determining the finally stitched image. Looked at from another perspective, the present invention allows for an approximation to be made of the number of photons that initially impinged upon a given portion of a film.

Figure 6:
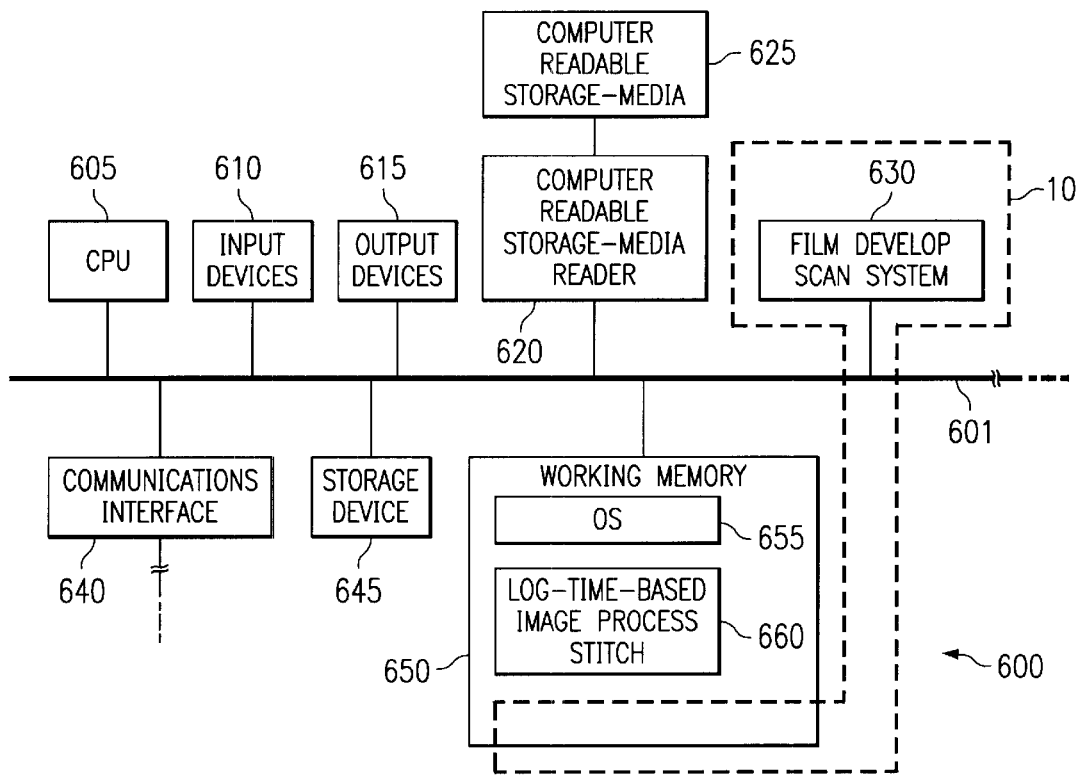
FIG. 6 illustrates a processing system within which stitching is preferably performed according to the present invention.

The FIG. 6 block diagram illustrates how a log-time processing and stitching system according to the invention preferably operates within a generally conventionally configured processing system, such as a personal computer or "PC.

As shown, system 600 preferably comprises processing system elements coupled via bus 601 including CPU 605, input devices 510 and output devices 615, computer readable storage media reader 620, communications interface 640, storage device 545 and working memory 650. Computer readable storage media reader 620 is further coupled to computer readable storage media 625, which combination preferably includes local and/or remote storage devices and/or memory and memory control functionality operable in combination with or alternatively with storage device 645 and/or working memory 650. System 600 further comprises film scanning system 10, preferably including the film development and scanning apparatus and methods taught by the above mentioned U.S. Pat. No. 5,519,510, which patent is hereby incorporated herein by reference as if, repeated verbatim immediately hereinafter. Working memory 650 further comprises software elements including operating system 655 and image processing/stitcher system 560. For clarity sake, conventionally well-known hardware and software elements including but not limited to necessary interfaces and/or drivers have been omitted from the figure.

It will be apparent to those skilled in the art that several variations of system 600 are contemplated and within the intended scope of the present invention. For example, various software elements, such as image-processing/stitcher system 560 might be implemented as hardware or a combination of hardware and software according to the performance and/or operational needs of a particular application. Such hardware or hardware and software can further be independently operable or integrated within system 600. Similarly, given processor and computer performance improvements and ongoing technological advancements, hardware elements such as such as portions of communications interface 540 might be replaced by software and/or a combination of hardware and software. Another example is that other implementations for providing timed-scan pixel data can also be used. A still further example is that various operating systems and data processing systems can be utilized. However, at least a conventional multitasking operating system such as Windows 95 or NT running on a Pentium II computer, are preferred and will be presumed for the discussion herein. Yet another example is that communications interface 540 can comprise any number of wired and/or wireless connections to a local and/or wide area network, the internet and/or other connectable devices and/or systems. Such connections enable a vast array of data transfer, sharing, workload distribution and other communications-related capabilities, as are continuously being introduced, advanced and more widely adopted. Input devices 550 can comprise any number of devices and/or device types for inputting commands and/or data, including but not limited to a keyboard, mouse, and/or speech recognition.

Figure 7:
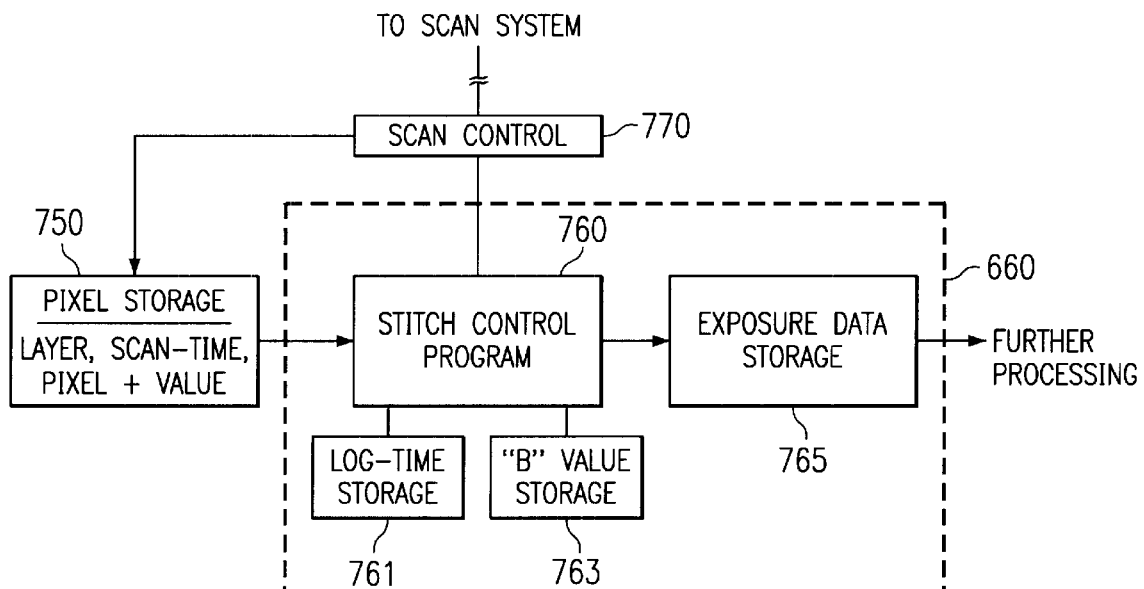
FIG. 7 is a functional block diagram illustrating a preferred stitching system according to the invention.

The FIG. 7 functional block diagram illustrates a preferred image processor/stitcher system 660 ("stitcher"). As shown, stitcher 660 comprises communicatingly coupled elements including stitch control 760 which, in the preferred embodiment of the present invention is an application program that is executed by the CPU 605, which program instantiates functionalities, including control and mathematical operations described herein. Log-time value storage 761, "b" value storage 763 and exposure data storage 765 are associated memory locations used to store data. Also shown are scan control 770 and pixel storage 750, which preferably operate in accordance with the above mentioned '510 patent or in a similar manner to provide timed-scan pixel data. More specifically, scan control 770 preferably performs scanning of each pixel that is being developed at different development times to obtain a detected signal values at each development time. For the monochromatic film discussed hereinafter in further detail, only a single through scan need be performed for each pixel. Alternately, if a color film is begin scanned, front, back and through scans are needed in order to obtain the exposure information for each color channel that exists on each the red, green and blue layers of the color film. Upon completion of each scan, scan control 770 preferably stores pixel information comprising the scan type (for color scans), scan time, pixel location and pixel signal value in pixel storage 750. Alternatively, however, the pixel information can be made available to stitcher 660 from any communicatingly coupled storage device, memory and/or processing system as discussed above.

Figure 8:
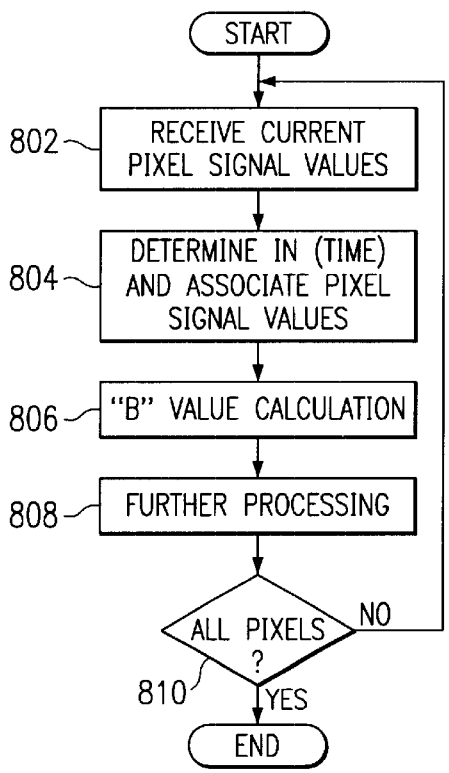
FIG. 8 is a flowchart illustrating a preferred stitching method according to the present invention.

In operation, as also, illustrated by the flowchart in FIG. 8, stitch control 760 preferably receives all of the pixel information for a current pixel from pixel storage 650 in step 802. Stitch control 760 then determines the log-time values that correspond to each timed-scan and associates each log time value with the appropriate signal value for that pixel, which data is stored in log-time value storage 761 and signal value storage 763 respectively in step 804. Log-time value storage 761 and signal value storage 763 are preferably maintained as lists located in memory. Thereafter in step 806, stitch control 660 calculates the optimal exposure or "brightness" value "b" value pixel and stores these "b" values that should be associated with the signal values for that pixel. Specifically, this requires determining the y-intercept of the best fit line of the signal value as plotted against In (time). The stored exposure value can then be utilized by a further processing system for further processing and forming prints, depicted in FIG. 8 as step 808. Thereafter, this process is repeated for each pixel until all pixel are processed, as shown by step 810. Of course, while this process has been described serially with respect to one pixel, various numbers of pixels can be operated upon in parallel, and the operation can be segmented in other manners, and still be within the intended scope of the invention.

With respect to the calculation of the "b" value in step 806, stitch control 660 preferably performs this as a linear regression calculation according to the following matrix equation-1:

Equation-1:

$$\begin{bmatrix} N & \sum \ln(t) \\ \sum \ln(t) & \sum \ln(t)^2 \end{bmatrix} \begin{bmatrix} b \\ m \end{bmatrix} = \begin{bmatrix} \sum s \\ \sum (s*\ln(t)) \end{bmatrix}$$
$$\quad A \qquad\qquad\qquad B \qquad\quad C$$

wherein N=the number a timed-scans is made for a given film pixel (or given pixel of a single film layer in a multiple layer film)

t=each scan time relative to the start of film developing s=a detected signal value corresponding to the signal received from the is sensor b=a derived exposure reference, which is linearly related to the inverse log of the actual exposure: and m=the slope of the plot of the signal detected values versus In (t).

The above matrix equation, solving matrix-B (i.e. "b" value and slope m) yields the following matrix equation-2, which is used to determine the "b" value for each pixel:

$$\begin{bmatrix} b \\ m \end{bmatrix} = \begin{bmatrix} n & \sum \ln(t) \\ \sum \ln(t) & \sum \ln(t)^2 \end{bmatrix}^{-1} \begin{bmatrix} \sum s \\ \sum (s*\ln(t)) \end{bmatrix} \quad \text{Equation-2}$$
$$\quad B \qquad\qquad A^{-1} \qquad\qquad C$$

Finding the "b" value in this manner significantly decreases computational requirements as compared with prior stitching methods, particularly for color images. In the case of a color image, all values in matrix $A^{-1}$ are applicable to all pixels in an image since the multiple scans (i.e., front, back and through) for a given pixel are performed at the same time (while there may be a slight difference in the time that the front, back and through scans of a color film are detected for a given development time, this difference in time is so minimal that it can be ignored). Thus, equation-2 above is solved for each pixel, thereby yielding a derived exposure value ("b"), as discussed, for each development time and these values are stored in pixel storage 765 as illustrated in FIG. 7. For purposes of the present invention, it should be noted that only the "b" value or "fitting constant" of this matrix needs to be solved. Thus, although the slope "m" could be determined, it is not needed.

It will be appreciated that the specific memory/storage structure configurations can vary substantially depending upon the specific application, for example, when using a PC to run multiple applications which might further utilize stored pixel data. Configurations include but are not limited to a number of data structures and/or use of variables such as with queues and/or multi-dimensional and/or distributed arrays and/or other structures. Further, any applicable calculation/determination order can be used.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the spirit and scope of the invention as set forth.

I claim:

1. A method of determining a fitting constant that can be used to establish an appropriate exposure of a pixel in an image, comprising the steps of:

receiving image data corresponding to said pixel, said image data including a plurality of scan time values, each scan time value corresponding to a time at which said pixel was scanned during a film development process, and a plurality of signal values, each signal value corresponding to a scan signal value produced at one of said plurality of scan times;

obtaining log-time values of each of said plurality of scan time values; and determining said fitting constant based upon an approximated linear relationship that exists between said log-time values and said signal values.

2. A method according to claim 1, wherein said fitting constant is determined at an initial start time of said film development process.

3. A method according to claim 2, wherein said fitting constant is equal to a y-intercept of a best fit line of said signal values as plotted on a y-axis at said corresponding log-time values plotted on a x-axis.

4. A method according to claim 1, wherein said method is performed by executable program code.

5. A method according to claim 4, wherein said executable program code is executed by a computer.

6. A method according to claim 1, wherein said image data is received from a digital film scanner.

7. A fitting constant produced according to the method of claim 1.

8. A method according to claim 1, further comprising processing said fitting constant to determine an exposure value.

9. An exposure value produced according to the method of claim 8.

10. A method according to claim 1, further comprising:

receiving additional image data corresponding to a plurality of remaining pixels in said image, said image data including a set of additional signal values corresponding to each of said remaining pixels; and determining, for each of said remaining pixels, an additional fitting constant based upon said approximated linear relationship that exists between a log of time constants corresponding to times during a film development process during which said remaining pixels were scanned and a corresponding set of additional signal values.

11. A method according to claim 10, wherein said time constants are treated equal to said scan time values and said log of time constants are treated as equal to said log-time values.

12. A method according to claim 1, wherein said image data comprises layer-specific image data corresponding to an image scanned from at least two layers of multi-layer film, said pixel corresponding to a first of said layers, further comprising:

receiving image data corresponding to a second pixel in a second layer, said image data including a plurality of second signal values, each signal value corresponding to a scan signal value produced at a scan time during a film development process; and determining a second fitting constant based upon an approximated linear relationship that exists between said second signal values and a log of time constants corresponding to said scan times.

13. A method according to claim 12, wherein said multi-layer film is a three layer color film.

14. A method according to claim 12, wherein said time constants are treated equal to said scan time values and said log of time constants are treated as equal to said log-time values.

15. An apparatus for determining a fitting constant that can be used to establish an appropriate exposure of a pixel in an image, comprising the steps of:

means for receiving image data corresponding to said pixel, said image data including a plurality of scan time values, each scan time value corresponding to a time at which said pixel was scanned during a film development process, and a plurality of signal values, each signal value corresponding to a scan signal value produced at one of said plurality of scan times;

means for obtaining log-time values of each of said plurality of scan time values; and means for determining said fitting constant based upon an approximated linear relationship that exists between said log-time values and said signal values.

16. An apparatus according to claim 15, wherein said means for determining said fitting constant determines said fitting constant in accordance with an equation $$[N \, \Sigma \ln(t)] \, [b] = [\Sigma]$$

wherein:
N = a number of times at which said pixel was scanned,
t = each of said scan time values,
b = said fitting constant, and
s = each of said signal values.

17. A method of determining, in a timed-scan image composed of a plurality of pixels, a fitting constant of at least one of said pixels comprising the steps of:

receiving image data corresponding to said pixel, said image data including scan time values corresponding to scan times at which said pixel was scanned and signal values produced by scanning said pixel at said scan times; and calculating said fitting constant in accordance with an equation $$[N \, \Sigma \ln(t)] \, [b] = [\Sigma]$$

wherein:
N = a number of times at which said pixel was scanned,
t = each of said scan time values,
b = said brightness value, and
s = each of said signal values.

18. A method according to claim 17, wherein said method is performed by executable program code.

19. A method according to claim 18, wherein said executable program code is executed by a computer.

20. A fitting constant produced according to the method of claim 17.

21. A method according to claim 17, further comprising processing said fitting constant to determine an exposure value.

22. An exposure value produced according to the method of claim 21.

* * * * *